US008302093B2

(12) United States Patent
Berg et al.

(10) Patent No.: US 8,302,093 B2
(45) Date of Patent: Oct. 30, 2012

(54) AUTOMATED DEPLOYMENT OF DEFINED TOPOLOGY IN DISTRIBUTED COMPUTING ENVIRONMENT

(75) Inventors: Daniel C. Berg, Holly Springs, NC (US); Brad L. Blancett, Raleigh, NC (US); Michael D. Elder, Durham, NC (US); Chad M. Holliday, Holly Springs, NC (US); Narinder Makin, Morrisville, NC (US); Timothy A. Pouyer, Greenville, SC (US); John Swanke, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 12/200,720

(22) Filed: Aug. 28, 2008

(65) Prior Publication Data

US 2010/0058331 A1 Mar. 4, 2010

(51) Int. Cl.
*G06F 9/445* (2006.01)
(52) U.S. Cl. ........ 717/177; 717/172; 717/168; 717/174; 717/120; 717/121; 717/122; 717/126
(58) Field of Classification Search .................. 717/172, 717/177–178
See application file for complete search history.

(56) References Cited

U.S. PATENT DOCUMENTS

| | | | | |
|---|---|---|---|---|
| 5,950,011 | A * | 9/1999 | Albrecht et al. | 717/167 |
| 5,970,490 | A | 10/1999 | Morgenstern | |
| 6,256,773 | B1 | 7/2001 | Bowman-Amuah | |
| 6,629,065 | B1 | 9/2003 | Gadh et al. | |
| 6,701,514 | B1 | 3/2004 | Haswell et al. | |
| 6,789,054 | B1 | 9/2004 | Makhlouf | |
| 6,795,089 | B2 | 9/2004 | Rajarajan et al. | |
| 7,013,461 | B2 * | 3/2006 | Hellerstein et al. | 717/177 |
| 7,050,872 | B2 | 5/2006 | Matheson | |
| 7,069,541 | B2 | 6/2006 | Dougherty et al. | |
| 7,069,553 | B2 | 6/2006 | Narayanaswamy et al. | |
| 7,072,900 | B2 * | 7/2006 | Sweitzer et al. | 1/1 |
| 7,103,874 | B2 * | 9/2006 | McCollum et al. | 717/121 |
| 7,134,122 | B1 | 11/2006 | Sero et al. | |
| 7,196,712 | B2 | 3/2007 | Rajarajan et al. | |

(Continued)

OTHER PUBLICATIONS

Arnold, W., et al., "Pattern Based SOA Deployment," Proc. of 5th Int'l Conf. on Service-Oriented Computing (ICSOC 2007), Sep. 17-20, 2007, Lecture Notes in Computer Science (LNCS), vol. 4749, Springer 2007.

(Continued)

*Primary Examiner* — Lewis A Bullock, Jr.
*Assistant Examiner* — Keith C Yuen
(74) *Attorney, Agent, or Firm* — Patents on Demand P.A.; Brian K. Buchhiet; Scott M. Garrett

(57) ABSTRACT

A method for deploying a software product comprising a plurality of components is provided. The method can include reading a topological description of the software product and its components, wherein the topological description defines characteristics and dependencies of the components. The method can further include reading characteristics of a plurality of publishers and matching each of the plurality of components to one of the plurality of publishers according to the characteristics and dependencies of the components and the characteristics of the plurality of publishers. A publisher may be a computer connected to a network. The method can further include distributing the plurality of components among the plurality of publishers responsive to the step of matching and validating each set of components distributed to each publisher.

12 Claims, 4 Drawing Sheets

U.S. PATENT DOCUMENTS

| | | | |
|---|---|---|---|
| 7,320,120 | B2 | 1/2008 | Rajarajan et al. |
| 7,370,315 | B1 | 5/2008 | Lovell et al. |
| 7,463,263 | B2 | 12/2008 | Gilboa |
| 7,568,019 | B1 | 7/2009 | Bhargava et al. |
| 7,630,877 | B2 | 12/2009 | Brown et al. |
| 7,643,597 | B2 | 1/2010 | Liu et al. |
| 7,653,902 | B2 * | 1/2010 | Bozak et al. ............... 717/177 |
| 7,665,085 | B2 | 2/2010 | Sundararajan et al. |
| 7,669,137 | B2 | 2/2010 | Chafe et al. |
| 7,735,062 | B2 | 6/2010 | de Seabra e Melo et al. |
| 7,856,631 | B2 * | 12/2010 | Brodkorb et al. ............ 717/177 |
| 8,185,873 | B2 * | 5/2012 | Pullara ...................... 717/121 |
| 2003/0084156 | A1 * | 5/2003 | Graupner et al. ............ 709/226 |
| 2003/0163450 | A1 | 8/2003 | Borenstein et al. |
| 2004/0179011 | A1 | 9/2004 | Marshall |
| 2006/0053410 | A1 * | 3/2006 | Charisius et al. ............ 717/109 |
| 2006/0066627 | A1 | 3/2006 | Gerhard et al. |
| 2006/0101091 | A1 | 5/2006 | Carbajales et al. |
| 2006/0101445 | A1 | 5/2006 | Carbajales et al. |
| 2006/0271909 | A1 | 11/2006 | Huang et al. |
| 2007/0074203 | A1 | 3/2007 | Curtis et al. |
| 2007/0179823 | A1 | 8/2007 | Bhaskaran et al. |
| 2007/0277151 | A1 | 11/2007 | Brunel et al. |
| 2007/0288885 | A1 | 12/2007 | Brunel et al. |
| 2008/0127049 | A1 | 5/2008 | Elaasar |
| 2008/0183725 | A1 | 7/2008 | Blakeley et al. |
| 2008/0313008 | A1 | 12/2008 | Lee et al. |
| 2008/0313595 | A1 | 12/2008 | Boulineau et al. |
| 2008/0313596 | A1 | 12/2008 | Kreamer et al. |
| 2009/0007062 | A1 | 1/2009 | Gilboa |
| 2009/0012842 | A1 | 1/2009 | Srinivasan et al. |
| 2009/0044170 | A1 | 2/2009 | Bernardi et al. |
| 2009/0077621 | A1 | 3/2009 | Lang et al. |
| 2009/0132562 | A1 | 5/2009 | Mehr et al. |
| 2009/0171993 | A1 | 7/2009 | Arthursson |
| 2009/0249281 | A1 | 10/2009 | Fritzsche et al. |
| 2009/0278847 | A1 | 11/2009 | Berg et al. |
| 2009/0319239 | A1 | 12/2009 | Arnold et al. |
| 2009/0319467 | A1 | 12/2009 | Berg et al. |
| 2010/0030893 | A1 | 2/2010 | Berg et al. |
| 2010/0031247 | A1 | 2/2010 | Berg et al. |
| 2010/0058331 | A1 | 3/2010 | Berg et al. |
| 2010/0070449 | A1 | 3/2010 | Arnold et al. |
| 2010/0077328 | A1 | 3/2010 | Arnold et al. |
| 2010/0083212 | A1 | 4/2010 | Fritzsche et al. |

OTHER PUBLICATIONS

Eilam, T., et al., "Reducing the Complexity of Application Deployment in Large Data Centers," Proc. of 9th IFIP/IEEE INT'l Sym. on Integrated Network Management (IM 2005), pp. 221-234, May 15-19, 2005.

Corneil, D., et al., "An Efficient Algorithm for Graph Isomorphism," Journal of the ACM, vol. 17, pp. 51-64, Jan. 1970.

Ullman, J., "An Algorithm for Subgraph Isomorphism," Journal of the ACM, vol. 23, pp. 31-42, Jan. 1976.

Gati, G., "Further Annotated Bibliography on the Isomorphism Disease," Journal of Graph Theory,1979; pp. 96-109; vol. 3, pp. 96-109, 1979.

Messmer, B.T., "Efficient Graph Matching Algorithms," University of Bern, PhD thesis, Switzerland, Nov. 1995.

Tsai, W., et al., "Error-correcting Isomorphisms of Attributed Relational Graphs for Pattern Analysis," IEEE Transactions on Systems, Man, and Cybernetics, vol. SMC-9, No. 12, pp. 757-768, Dec. 1979.

* cited by examiner

AUTOMATED DEPLOYMENT OF DEFINED TOPOLOGY IN DISTRIBUTED COMPUTING ENVIRONMENT

BACKGROUND OF THE INVENTION

1. Field of the Invention

The present invention relates to distributed computing environments, and more particularly to improved methods for managing deployment of software in distributed computing environments.

2. Description of the Related Art

In a typical software development environment, there exists a gap between the finished software product and its target deployment computing environment. The responsibility of carrying a software product into real-life operation is typically left to the deployment engineer or technician, who often does not have first-hand knowledge of the details and requirements of the developed software product. The usual means to carry a software product into operation is via manually created scripts or other tooling that functions solely in the operations computing environment. Additionally, the configuration information of the software product is passed in the form of notes, spreadsheets or presentation slides that lack a formal construct. Conventionally, deployment of a software product is documented on paper or a pictorial document without an intuitive mechanism for realizing or enforcing the defined topology.

The approach above can result in difficulty for the deployment engineer or technician, who often is forced to deal with solving configuration problems that arise from incompatibilities between the requirements of the developed software product and the capabilities provided by the target computing environment. These problems persist throughout the lifecycle of the software product and the gap worsens with the move of the software product during different stages, such as the moves from unit testing to integration and further to production. Since the software product is not developed in light of the target computing environment, this often results in a software product that cannot properly be deployed or replicated in different computing environments and must be re-architected.

Often times, a software product must be deployed in a distributed computing environment wherein components of the software product are located in different locations and must work in concert over a network. Another problem with the approach above is that it does not provide adequate information on how various components of a software product can be divided or distributed when the product is deployed in a distributed computing environment. Various relationships and dependences exist between components of a software product, and the manner in which a software product is divided or parsed in a distributed computing environment depends on those relationships and dependences. The deployment engineer or technician responsible for deploying a software product in a distributed computing environment often does not have the necessary knowledge of the relationships and dependences that exist between components of a software product so as to effectuate such a deployment. As such, this produces problems during deployment, maintenance and further development of the software product.

Therefore, there is a need to overcome the shortcomings of the prior art and more particularly for a more efficient way of deploying a defined topology in a distributed computing environment.

BRIEF SUMMARY OF THE INVENTION

Embodiments of the present invention address deficiencies of the art in respect to distributed computing systems and provide a novel and non-obvious method, computer system and computer program product for managing the deployment of software in a distributed computing environment. In one embodiment of the invention, a method for deploying a software product comprising a plurality of components is provided. The method can include reading a topological description of the software product and its components, wherein the topological description defines characteristics and dependencies of the components. The method can further include reading characteristics of a plurality of publishers and matching each of the plurality of components to one of the plurality of publishers according to the characteristics and dependencies of the components and the characteristics of the plurality of publishers. The method can further include distributing the plurality of components among the plurality of publishers responsive to the step of matching and validating each set of components distributed to each publisher.

In another embodiment of the invention, a computer program product comprising a computer usable medium embodying computer usable program code for deploying a software product comprising a plurality of components is provided. The computer program product includes computer usable program code for reading a topological description of the software product and its components, wherein the topological description defines characteristics and dependencies of the components. The computer program product further includes computer usable program code for reading characteristics of a plurality of publishers and matching each of the plurality of components to one of the plurality of publishers according to the characteristics and dependencies of the components and the characteristics of the plurality of publishers. The computer program product further includes distributing the plurality of components among the plurality of publishers responsive to the step of matching and validating each set of components distributed to each publisher In another embodiment of the invention, a server for deploying a software product comprising a plurality of components is provided. The server includes a data repository for storing a topological description of the software product and its components, wherein the topological description defines characteristics and dependencies of the components, and for storing characteristics of a plurality of publishers. The server further includes a processor configured for matching each of the plurality of components to one of the plurality of publishers according to the characteristics and dependencies of the components and the characteristics of the plurality of publishers. The server further includes a transmitter for distributing the plurality of components among the plurality of publishers responsive to the step of matching. The server further includes a receiver for validating each set of components distributed to each publisher.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

The present invention addresses deficiencies with respect to managing the deployment of software comprising a plurality of components in a distributed computing environment. The present invention includes reading a topological description of the software product and its components, wherein the topological description defines characteristics and dependencies of the components. A characteristic of a component may include a type, and a dependency may include a hosting dependency and an access dependency. Next, characteristics of a plurality of publishers, i.e., servers, are read. A characteristic of a publisher may include a type and a hosting capability. Subsequently, each component is matched to a publisher according to the characteristics and dependencies of the components and the characteristics of the publishers. Then, the components are distributed among the publishers according to the matching step and each set of components is validated.

Figure 1:
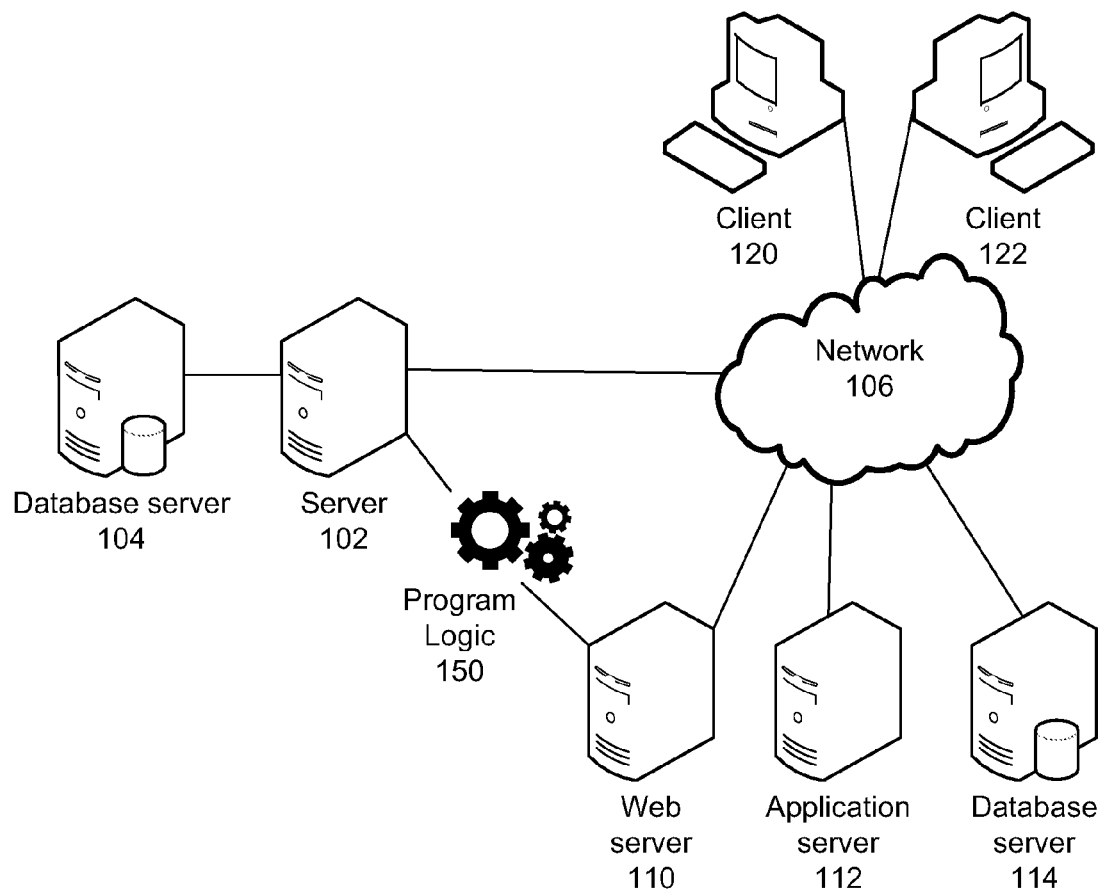
FIG. 1 is a block diagram illustrating a network architecture for a system for managing the deployment of software in a distributed computing environment, according to one embodiment of the present invention.

FIG. 1 is a block diagram illustrating a network architecture for a system for managing the deployment of software in a distributed computing environment, according to one embodiment of the present invention. The exemplary embodiments of the present invention adhere to the system architecture of FIG. 1. FIG. 1 shows an embodiment of the present invention wherein program logic 150 executing on computer or server 102 deploys multiple components of a software program among servers 110-114 and clients 120-122 over a network 106. The servers 110-114 and clients 120-122 are considered "publishers" for the purpose of the present invention, since the aforementioned computers may host (i.e., publish) components of the software product.

FIG. 1 shows server 102, servers 110-114 and clients 120-122 connected to network 106 via computers, such as desktop personal computers, workstations or servers. Server 102 is used by an administrator to create a topology or map that describes a multi-component software product and deploys the components among a distributed computing environment, such as among web server 110, application server 112, database sever 114 and client computers 120-122. Server 102 also validates software components that are deployed among the distributed computing environment, as described in greater detail below.

FIG. 1 further shows that server 102 may include a database server 104. The database server 104 serves data from a database, which is a repository for data used by server 104 during the course of operation. The data served by database server 104 is described in greater detail below. The database of database server 104 may adhere to any one of the flat model, hierarchical model, object-oriented model or a relational model for databases.

The database server 104 may also include a database management system, which is an application that controls the organization, storage and retrieval of data (fields, records and files) in the database. A database management system accepts requests for data from the server 102, and instructs the operating system to transfer the appropriate data. The database management system may also control the security and integrity of the database. Data security prevents unauthorized users from viewing or updating certain portions of the database.

Web server 110 includes a software engine that delivers web applications. Application server 112 includes a software engine that delivers applications of all types. Database server 114 includes a software engine that delivers database applications and database information. The servers 110-114 may adhere to any commercially available server platform, such as the Sun Microsystems J2EE platform, a Web-based application platform, an integrated platform for e-commerce or a content management system platform.

It should be noted that although FIG. 1 shows the distributed computing environment comprising only web server 110, application server 112, database sever 114 and client computers 120-122, the system of the present invention supports any number of servers and computers as comprising the distributed computing environment.

In an embodiment of the present invention, the computer systems of server 102, web server 110, application server 112, database sever 114 and client computers 120-122 are one or more Personal Computers (PCs), Personal Digital Assistants (PDAs), hand held computers, palm top computers, lap top computers, smart phones, game consoles or any other information processing devices. A PC can be one or more IBM or compatible PC workstations running a Microsoft Windows or LINUX operating system, one or more Macintosh computers running a Mac OS operating system, or an equivalent. In another embodiment, the computer systems are a server system, such as SUN Ultra workstations running a SunOS operating system or IBM RS/6000 workstations and servers running the AIX operating system.

In an embodiment of the present invention, the network 106 is a circuit switched network, such as the Public Service Telephone Network (PSTN). In another embodiment, the network 106 is a packet switched network. The packet switched network is a wide area network (WAN), such as the global Internet, a private WAN, a local area network (LAN), a telecommunications network or any combination of the above-mentioned networks. In yet another embodiment, the structure of the network 106 is a wired network, a wireless network, a broadcast network or a point-to-point network.

FIG. 1 further shows program logic 150 comprising computer source code, scripting language code or interpreted language code that is compiled to produce computer instructions that perform various functions of the present invention. Specifically, the program logic 150 includes computer instructions that facilitate creating a topology or map that describes a multi-component software product, deploys the components among a distributed computing environment and subsequently validates the software components.

Figure 2A:
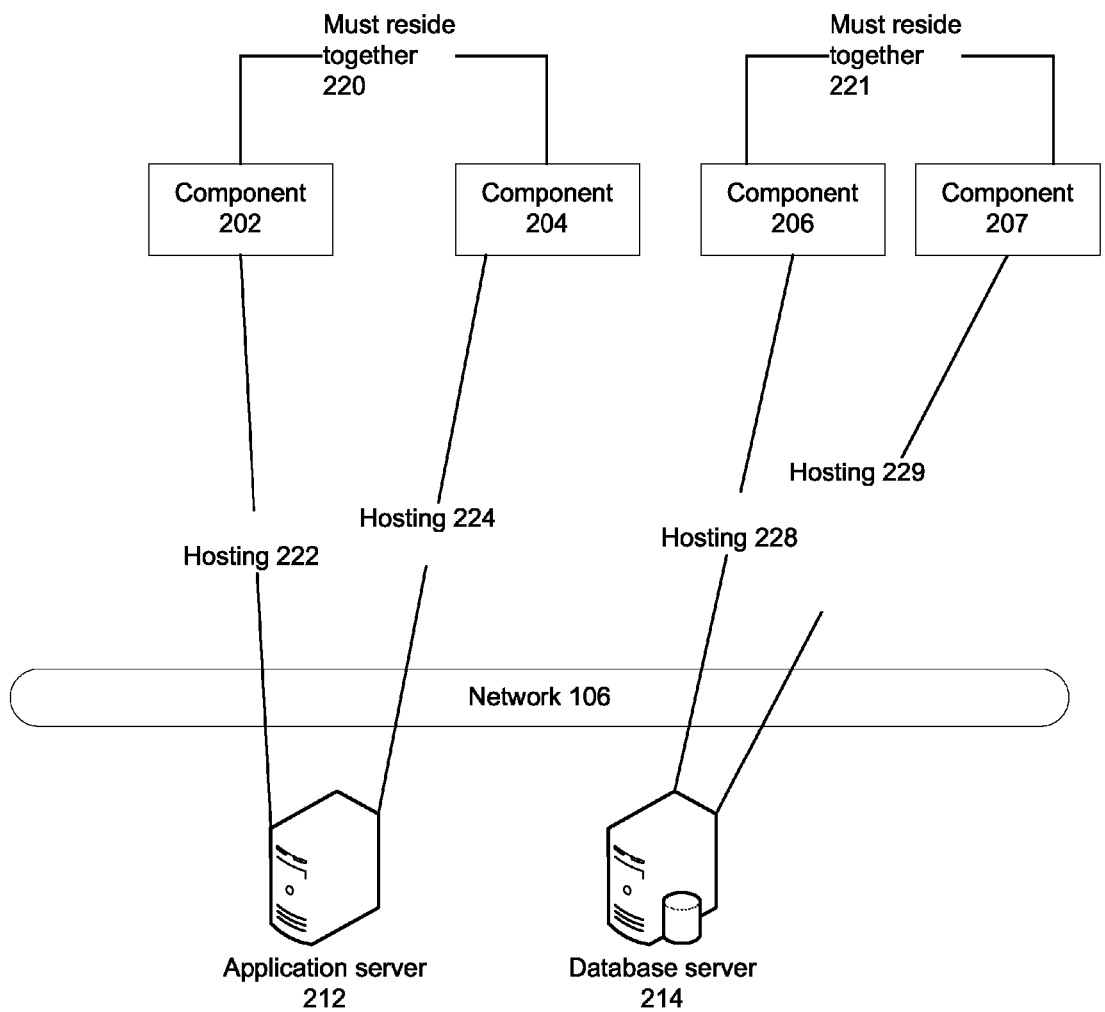
FIG. 2A is a block diagram illustrating a topological model for multi-component software in a distributed computing environment, according to one embodiment of the present invention.

FIG. 2A is a block diagram illustrating a topological model for multi-component software in a distributed computing environment, according to one embodiment of the present invention. FIG. 2A shows an example of a topological model that describes a desired topology for a multi-component software product. The topological model of FIG. 2A may be generated by an administrator using server 102 and database server 104.

FIG. 2A shows a software product comprising four components 202, 204, 206 and 207. Characteristics can be specified for each component. Examples of characteristics that may be specified for a software component include a type, such as a database component, an archive component, a dynamic link library, etc.

FIG. 2A further shows that several dependencies are specified for several components. A hosting dependency states that a component must be hosted by a particular publisher or server. A "must access" dependency states that a component must have access to a particular publisher or server, or component. A "must reside together" dependency states that two or more components must reside on the same publisher or server.

FIG. 2A shows that both component 202 and component 204 have a hosting dependency 222, 224 upon application server 212. This may be because components 202 and 204 are applications that must execute on an application server. Components 206 and 207 have a hosting dependency 228, 229 upon database server 214. This may be because components 206-207 are database components that must be hosted on a database serer. Also, components 202 and 204 have a "must reside together" dependency 220, perhaps because the two components must be compiled or executed together to operate appropriately. Likewise, components 206 and 207 have a "must reside together" dependency 221, because the two components must be compiled or executed together to operate appropriately.

Figure 2B:
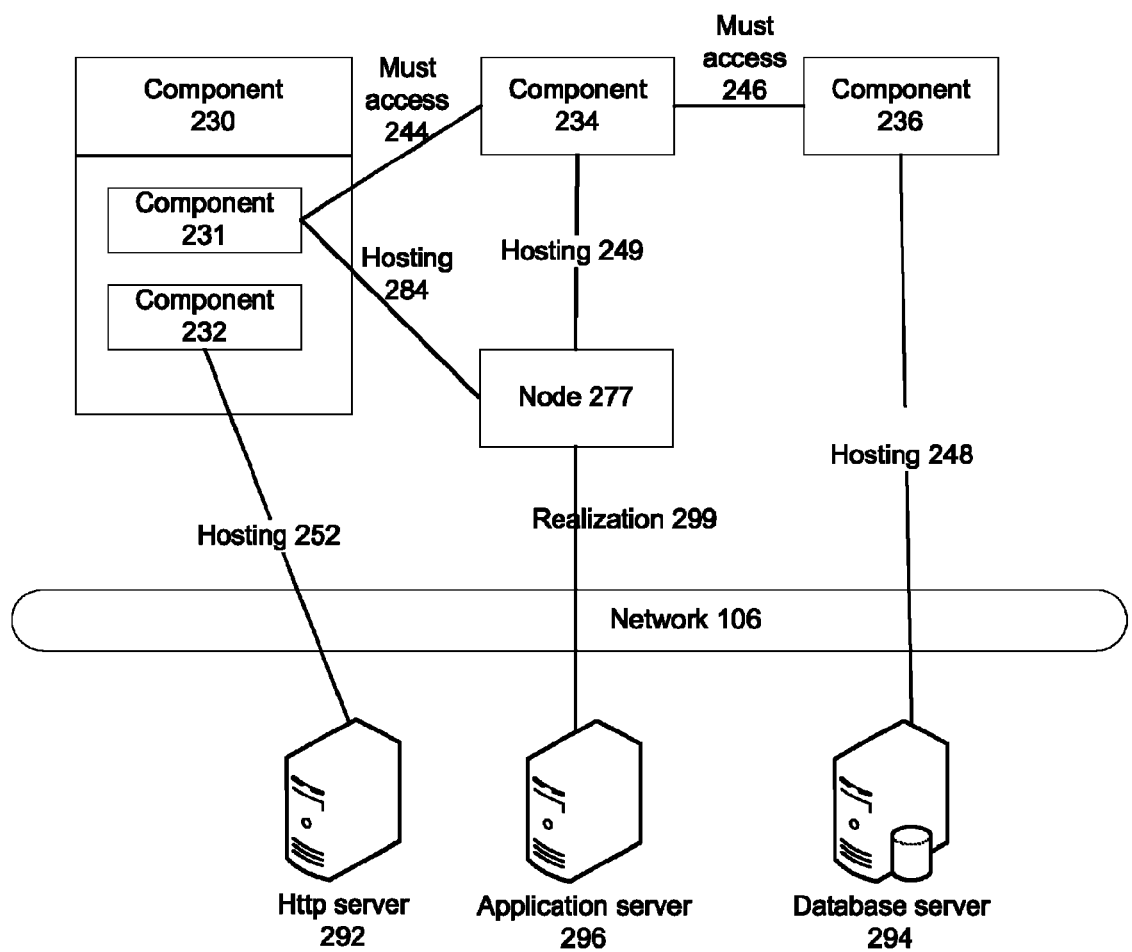
FIG. 2B is a block diagram illustrating another topological model for multi-component software in a distributed computing environment, according to one embodiment of the present invention.

FIG. 2B is a block diagram illustrating another topological model for multi-component software in a distributed computing environment, according to one embodiment of the present invention. FIG. 2B shows another example of a topological model that describes a desired topology for a multi-component software product. The topological model of FIG. 2B may be generated by an administrator using server 102 and database server 104.

FIG. 2B shows a software product comprising three components 230, 234, 236. As in FIG. 2A, characteristics can be specified for each component. Items 231, 232 are sub-components of component 230.

FIG. 2B further shows that several dependencies are specified for several components. Besides, hosting dependencies, "must access" dependencies, and "must reside together" dependencies, a "realization" dependency state is used to derive concrete components for conceptual ones. Conceptual components are typically used for patterns and do not have enough information to publish separately.

FIG. 2B shows that sub-component 232 has a hosting dependency 252 upon http server 292. Sub-component 231 has a hosting dependency 284 upon node 277. Component 231 also has a "must access" dependency 244 to component 234, which, in turn, has a "must access" dependency 246 to component 236. Component 234 has a hosting dependency 249 with node 277, which, in turn, has a realization dependency 299 with application server 296. Lastly, component 236 has a hosting dependency 248 to database server 294. FIG. 2B shows that sub-components of the same component can be hosted on different servers. FIG. 2B also shows that multiple hosting relationships may be made to a node, which, in turn, can have a realization dependency on a single server.

Figure 3:
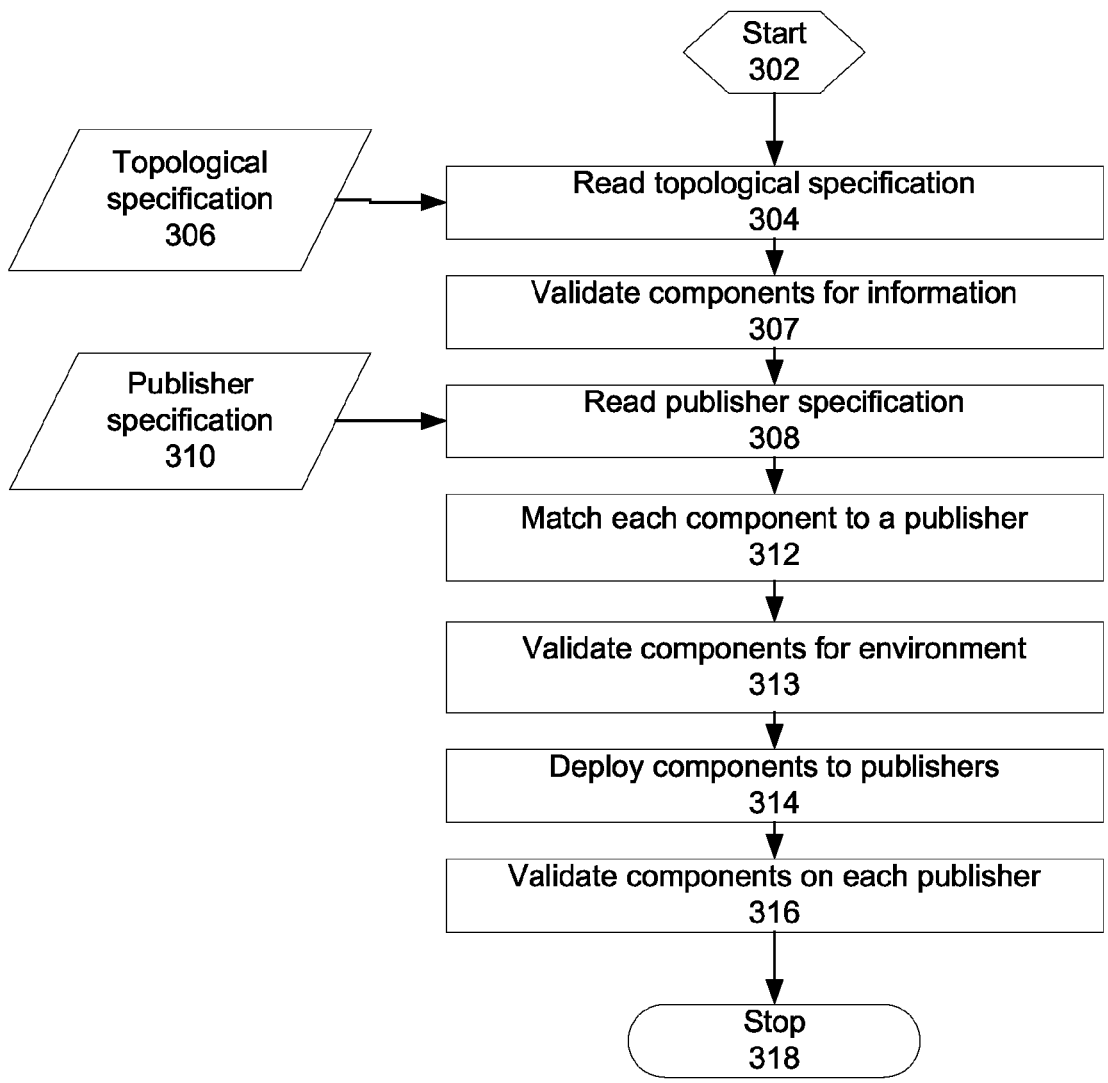
FIG. 3 is a flow chart depicting the control flow for managing the deployment of software in a distributed computing environment, according to one embodiment of the present invention.

FIG. 3 is a flow chart depicting the control flow for managing the deployment of software in a distributed computing environment, according to one embodiment of the present invention. The control flow of FIG. 3 begins with step 302 and moves directly to step 304. In step 304, the topological specification 306, as defined in greater detail in FIG. 2, is read by program logic 150. In step 307, the program logic 150 validates the components of the topological specification 306 to verify that each component possesses the sufficient information to publish. Next, in step 308, the publisher specification 310 is read by program logic 150.

The publisher specification 310 may be generated by an administrator using server 102 and database server 104 or may be a document generated automatically or manually beforehand by garnering information from the various publishers. The publisher specification 310 includes a list of characteristics for each publisher. A characteristic of a publisher may include a type, such as a database type, and a hosting capability, such as the ability to host applications.

In step 312, each component is matched to a publisher based on the characteristics of each component versus the characteristics of each publisher and based on the dependencies specified for each component. In step 313, the program logic 150 validates each component/publisher match to verify that each publisher possesses the adequate environmental settings to publish to matching component. Step 313 includes confirming that each component or set of components can be compiled appropriately and executed properly on each publisher. Step 313 may also include confirming that the publisher for each component or set of components includes the required libraries or other necessary files to compile and execute the component or set of components.

In step 314, each component is deployed or distributed to the publisher with which it was matched. In step 316, each component or set of components deployed to each publisher is validated. Validation includes a process by which the presence and proper functioning of each component or set of components on each publisher is confirmed using feedback from the publisher. In step 318, the control flow of FIG. 3 ceases.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for deploying a software product comprising a plurality of components, comprising:
    reading a topological description of the software product and its components, wherein the topological description defines characteristics and dependencies of the components, and wherein a dependency includes at least a must-access dependency and a realization dependency, wherein a must-access dependency states that a component must have access to a particular publisher, and a realization dependency is used to derive concrete components for conceptual ones;
    reading characteristics of a plurality of publishers;
    matching each of the plurality of components to one of the plurality of publishers according to the characteristics and dependencies of the components and the characteristics of the plurality of publishers;
    distributing the plurality of components among the plurality of publishers responsive to the step of matching; and
    validating each set of components distributed to each publisher comprises: confirming, using feedback from the publisher, that the set of components can compile and execute on the corresponding publisher.

2. The method of claim 1, wherein the first step of reading further comprises:
    reading the topological description of the software product and its components, wherein the topological description defines characteristics and dependencies of the components, and wherein a characteristic of a component includes a type.

3. The method of claim 1, wherein the second step of reading further comprises: reading characteristics of a plurality of publishers, wherein a publisher comprises a server.

4. The method of claim 1, wherein the second step of reading further comprises: reading characteristics of a plurality of publishers, wherein a characteristic of a publisher comprises a type of publisher, a hosting capability.

5. A computer program product comprising a non-transitory computer usable storage medium embodying computer usable program code for deploying a software product comprising a plurality of components comprising:
    computer usable program code, stored in at least one non-transitory storage medium, for reading a topological description of the software product and its components, wherein the topological description defines characteristics and dependencies of the components, and wherein a dependency includes at least a must-access dependency and a realization dependency, wherein a must-access dependency states that a component must have access to a particular publisher, and a realization dependency is used to derive concrete components for conceptual ones;
    computer usable program code, stored in at least one non-transitory storage medium, for reading characteristics of a plurality of publishers;
    computer usable program code, stored in at least one non-transitory storage medium, for matching each of the plurality of components to one of the plurality of publishers according to the characteristics and dependencies of the components and the characteristics of the plurality of publishers;
    computer usable program code, stored in at least one non-transitory storage medium, for distributing the plurality of components among the plurality of publishers responsive to the computer usable program code for matching; and
    computer usable program code, stored in at least one non-transitory storage medium, for validating each set of components distributed to each publisher comprises: confirming, using feedback from the publisher, that the set of components can compile and execute on the corresponding publisher.

6. The computer program product of claim 5, wherein the computer usable program code for reading further comprises:
    computer usable program code, stored in at least one non-transitory storage medium, for reading the topological description of the software product and its components, wherein the topological description defines characteristics and dependencies of the components, and wherein a characteristic of a component includes a type.

7. The computer program product of claim 5, wherein the computer usable program code for reading further comprises:
    computer usable program code for reading characteristics of a plurality of publishers, wherein a publisher comprises a server.

8. The computer program product of claim 5, wherein the computer usable program code for reading further comprises:
    computer usable program code for reading characteristics of a plurality of publishers, wherein a characteristic of a publisher comprises a type of publisher, a hosting capability.

9. A server for deploying a software product comprising a plurality of components, comprising:
    a data repository for storing a topological description of the software product and its components, wherein the topological description defines characteristics and dependencies of the components, and wherein a dependency includes at least a must-access dependency and a realization dependency, wherein a must-access dependency states that a component must have access to a particular publisher, and a realization dependency is used to derive concrete components for conceptual ones, and for storing characteristics of a plurality of publishers;
    a processor configured for matching each of the plurality of components to one of the plurality of publishers according to the characteristics and dependencies of the components and the characteristics of the plurality of publishers;
    a transmitter for distributing the plurality of components among the plurality of publishers responsive to the step of matching; and
    a receiver for validating each set of components distributed to each publisher comprises: confirming, using feedback from the publisher, that the set of components can compile and execute on the corresponding publisher.

10. The server of claim 9, wherein a characteristic of a component includes a type.

11. The server of claim 9, wherein a publisher comprises a server.

12. The server of claim 9, wherein a characteristic of a publisher comprises a type of publisher, and a hosting capability.

* * * * *